(12) United States Patent
Shimoji (10) Patent No.: US 7,506,949 B2
(45) Date of Patent: Mar. 24, 2009

(54) INKJET PRINTING APPARATUS, INKJET PRINTING METHOD, PROGRAM, AND STORAGE MEDIUM

(75) Inventor: Jun Shimoji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 11/615,366

(22) Filed: Dec. 22, 2006

(65) Prior Publication Data

US 2007/0165054 A1    Jul. 19, 2007

(30) Foreign Application Priority Data

Dec. 27, 2005   (JP)   ............................. 2005-376674
Dec. 21, 2006   (JP)   ............................. 2006-344671

(51) Int. Cl.
*B41J 2/205*   (2006.01)

(52) U.S. Cl. .......................................... 347/15; 347/43
(58) Field of Classification Search ................... 347/14, 347/15, 43
See application file for complete search history.

(56) References Cited

U.S. PATENT DOCUMENTS

| | | | |
|---|---|---|---|
| 6,164,745 A * | 12/2000 | Nagoshi et al. | 347/15 |
| 6,254,217 B1 * | 7/2001 | Askeland et al. | 347/43 |
| 6,315,387 B1 | 11/2001 | Horikoshi | |
| 6,827,424 B2 * | 12/2004 | Teshigawara et al. | 347/43 |
| 2005/0128234 A1 | 6/2005 | Yokozawa | |

FOREIGN PATENT DOCUMENTS

| | | |
|---|---|---|
| JP | 2001-171151 | 6/2001 |
| JP | 2005-169940 | 6/2005 |

* cited by examiner

*Primary Examiner*—Thinh H Nguyen
(74) *Attorney, Agent, or Firm*—Fitzpatrick, Cella, Harper & Scinto (57) ABSTRACT

The invention obtains superior printing quality even when printing at high speed, thinning the number of multi-pass inkjet printing scans. The inkjet printing apparatus comprises a printhead composed of multiple printing element arrays that are arranged corresponding to ink colors in the main scanning direction, and a unit that makes the printing duty of at least one printing element array vary with regard to the printing duty of other printing element arrays, according to the printing element arrays.

7 Claims, 11 Drawing Sheets

INKJET PRINTING APPARATUS, INKJET PRINTING METHOD, PROGRAM, AND STORAGE MEDIUM

BACKGROUND OF THE INVENTION

1. Field of the Invention

The present invention relates to an inkjet printing apparatus, an inkjet printing method, a program, and a storage medium that perform reciprocal printing.

2. Description of the Related Art

The use of information processing apparatuses, including but not limited to copying apparatuses, fax machines, word processors, or computers, to say nothing of all types of communications devices, is spreading rapidly. One class of these devices is a printing apparatus that uses an inkjet protocol printhead to perform digital image printing.

In order to increase the printing speed, a printhead, which integrates a plurality of orifices that discharge ink, also known as nozzles, and fluid channels, is used with such inkjet protocol printing apparatuses, in the form of a printing element array that organizes a plurality of printing elements. When providing support for colorization, a printhead is used that comprises a plurality of printing element arrays that support each color.

Unlike a printhead of a black-and-white printer that only prints text, printing a full-color image demands that a range of conditions be satisfied, including but not limited to color development, tonality, and uniformity. In order to print high-quality full-color images, therefore, it is necessary to control the printhead in a manner that takes a variety of factors into account.

Of particular concern with regard to uniformity are the slight discrepancies that arise in the course of the process of manufacturing the printhead printing element array. That is, the various volumes and facings of direction of the ink discharged from the various nozzles vary subtly when using a printhead with dispersion at the nozzle level to perform the printing of a full-color image. Consequently, unevenness emerges in density in the ultimately printed full-color image, which is a cause of degraded quality in the printed image. A multi-pass printing method has accordingly been proposed that is capable of minimizing the unevenness of density, by having a given printhead use print scanning to gradually print equal printing areas, using different nozzles to perform a plurality of printhead printing scans.

So-called multi-pass printing involves using different nozzles per printing scan to print all print pixels within the image area in a single printing scan, which halves the impact that unevenness of density, caused by specific nozzle discrepancies would have on the printed image, which noticeably alleviates unevenness of density in full-color images as printed on printing paper.

When performing multi-pass and reciprocal scanning, however, priority color varies depending on ink stamping sequence, in the forward scanning direction and the reverse scanning direction, resulting in a rendering of differing colors vis-à-vis human visual capabilities.

For example, consider a four-color head, which uses a printhead with printing colors positioned, from right to left, Black (Bk), Cyan (C), Magenta (M), and Yellow (Y), and performs print scanning by moving the printhead reciprocally in the direction of the four-color head array, i.e., the left-right direction. Forward scanning by the printhead discharges ink from the respective nozzle arrays and prints the image in the left-hand direction, and reverse scanning by the printhead discharges ink from the respective nozzle arrays and prints the image in the right-hand direction.

In these circumstances, the printing sequence for each color on printing paper follows the four-color printhead array sequence; for example, if a green signal, i.e., cyan+yellow, is input into a given area, then ink is absorbed into all pixels in the order of cyan, followed by yellow. Therefore, cyan is the priority color, as it is absorbed first in the scanning sequence when the printhead moves to the left, and a cyan-enhanced green dot will be formed on the printing paper.

Conversely, reverse scanning, which moves the printhead to the right, also reverses the ink absorption sequence. Put another way, reverse scanning results in ink being absorbed yellow first, followed by cyan, forming a yellow-enhanced green dot on the printing paper. Having the printhead repeat such reciprocal scanning results in forming a region comprising cyan-enhanced green dots and yellow-enhanced green dots, depending on printing by forward scanning, or by reverse scanning.

If printing paper advance is performed at the width of the printhead for the respective scans, the area of cyan-enhanced green and the area of yellow-enhanced green are mutually repeated, corresponding to the width of the printhead. Consequently, color discrepancies arise per print scan in printed images that are supposed to have uniform greens, thus giving rise to significant image degradation.

Furthermore, greater high-speed printing and high-image quality printing are being demanded in current times, and the multi-pass printing method wherein a printhead partitions printing scans into a plurality of scans, is undesirable for printing apparatuses, as it doubles the printing time where printing is concerned, at a minimum.

U.S. Pat. No. 6,315,387 proposes an inkjet printing apparatus such that the sequence wherein the order in which ink is overlaid is the same for the forward scan and reverse scan, and that the printing element array, corresponding to the various printhead inks, is symmetric in the main scan direction.

By using printheads with such arrangements to perform reciprocal scanning, color discrepancies in printed images that would originate in the ink application sequence are minimized. Furthermore, it is also possible to achieve high-speed printing in multi-pass printing without increasing the number of printhead scans.

Japanese Patent Laid-Open No. 2001-171151 discloses an inkjet printing apparatus that positions a printhead printing element array of Bk, C, M, Y, M, and C, and interchanges the M and C printing elements used in printing in forward printing and reverse printing.

SUMMARY OF THE INVENTION

The pre-existing examples have issues of the following sorts, however:

Positioning printhead element arrays corresponding to the various inks so as to be symmetric in the main scanning direction led to high-speed printing with reduced numbers of printhead scan passes with regard to multi-pass printing. As a result, the overall printing duty of a printhead has doubled with regard to a single print scan, giving rise to the problems of the ink being insufficiently fixed to the printing paper, and ever larger ink droplets ultimately being applied.

If large ink droplets are applied to the printing paper in this fashion in a comparatively short time interval, there is a danger that the borders of adjacent ink dots will blend, resulting in colors being mixed, or blurred, in their varying border zones. A further problem results when bleeding occurs, in which text or lines run, significantly degrading the quality of the printed image.

The object of the present invention is to reduce the number of multi-pass scans without giving rise to color discrepancies, thus deriving superior printing quality with minimal color blending or bleeding even when performing high-speed printing.

In order to attain the above-mentioned object, an inkjet printing apparatus according to an embodiment of the present invention comprises: a plurality of printing element arrays of a plurality of printing elements for a given ink that are arranged in a first direction, and which move the plurality of printing element arrays vis-à-vis the a printing medium in a relative direction that intersects the first direction to perform printing in line with image data;

a memory adapted to store a plurality of mask patterns having different mask rates, for thinning the image data; and a generation unit adapted to, using the mask pattern, generate the printing data so as to vary the printing duty for the front-side printing element array and the printing duty for the back-side printing element array in the direction of the relative movement, in the plurality of printing element arrays, wherein the generation unit selects the mask pattern used to generate the printing data in accordance with printing conditions.

In order to attain the above-mentioned object, an inkjet printing apparatus according to another embodiment of the present invention comprises:

a plurality of printing element arrays of a plurality of printing elements for a plurality of colors of ink that are arranged in a first direction, and which move the plurality of printing element arrays vis-à-vis the a printing medium in a relative direction that intersects the first direction to perform printing in line with the image data;

a memory adapted to store a plurality of mask patterns having different mask rates, for thinning the image data; and a generation unit adapted to, using the mask pattern, generate the printing data so as to vary the printing duty for the front-side printing element array and the printing duty for the back-side printing element array in the direction of the relative movement, for at least one printing element array in the plurality of printing element arrays, wherein the generation unit selects the mask pattern used to generate the printing data in accordance with printing conditions.

In order to attain the above-mentioned object, an inkjet printing method according to still another embodiment of the present invention comprises the steps of:

using a plurality of printing element arrays of a plurality of printing elements for a given ink that are arranged in a first direction, and which move the plurality of printing element arrays vis-à-vis the a printing medium in a relative direction that intersects the first direction to perform printing in line with image data; and generating, using a mask pattern, the printing data so as to vary the printing duty for the front-side printing element array and the printing duty for the back-side printing element array in the direction of the relative movement, in the plurality of printing arrays, wherein the mask pattern used to generate the printing data is selected in accordance with printing conditions.

To achieve the object, additional embodiments of the present invention will provide a program, capable of being executed on a computer, which describes, in program code, the inkjet printing method according to the embodiment.

To achieve the object, additional embodiments of the present invention will provide a storage medium that is capable of loading the program into a computer according to the embodiment.

The present invention will make it possible to reduce the number of multi-pass scans without giving rise to color discrepancies, thus deriving superior printing quality with minimal color blending or bleeding, even-when performing high-speed printing.

Further features of the present invention will become apparent from the following description of exemplary embodiments with reference to the attached drawings.

DESCRIPTION OF THE EMBODIMENTS

Figure 1:
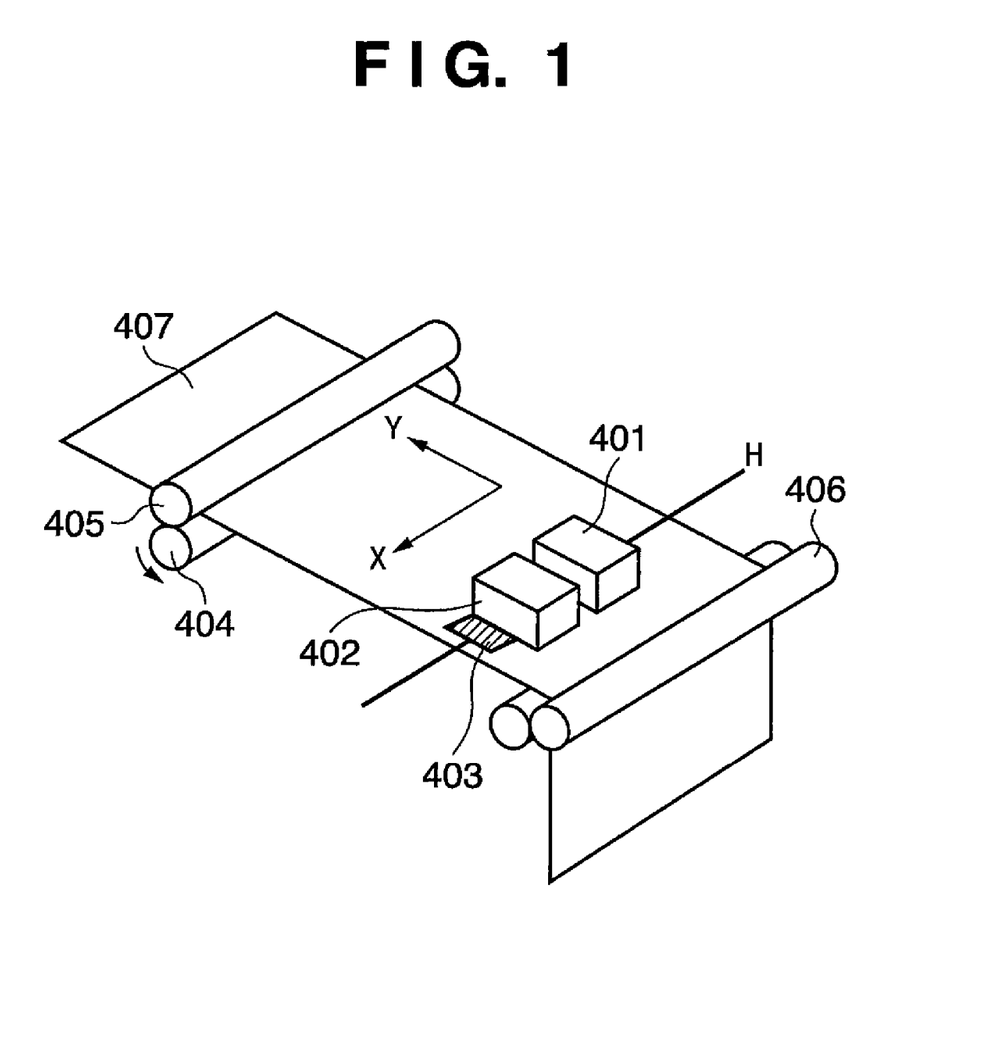
FIG. 1 is an oblique view of the principal components required to describe an embodiment of the inkjet printing apparatus of the present invention, FIG. 2. depicts the ink nozzle arrays for the first printhead and the second printhead, respectively, according to a first embodiment, FIG. 3. is a block diagram that depicts a printhead control block according to the embodiment of the present invention.
Figure 2:
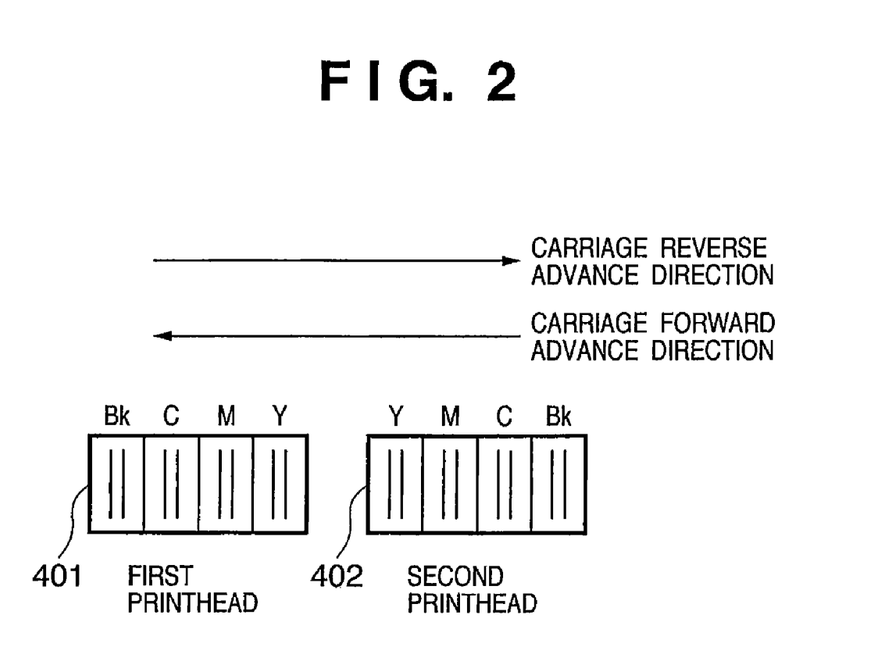

FIGS. 1 and 2 describe operations and an example of an assembly of structural components of an inkjet printing apparatus that performs fluid discharge and printing operations, and that may be used according to the embodiment of the present invention. In FIG. 1, a reference numeral 401 is a first printhead, comprising ink tanks within which are sealed four colors of ink, i.e., Bk, C, M, and Y, and a multi-print head that is integrated from the four printheads that correspond to the four ink tanks.

A reference numeral 402 is a second printhead, comprising a multi-printhead assembly similar to that of the first printhead 401. As shown in FIG. 2, the printhead 402 nozzle array for printing four-color ink, i.e., Y, M, C, and Bk, is the inverse of the array sequence of the printhead 401 nozzle array. With regard to the first printhead 401 and the second printhead 402, the first printhead 401 is positioned on the front-side, which is the upstream side of the forward scanning progress direction.

As shown in FIG. 2, the nozzles that discharge the various colors of ink in the first printhead 401 are arranged as Bk, C, M, and Y, from the upstream side. The second printhead 402 is positioned on the back-side, in the forward scanning progress direction. The sequence of nozzles of the second printhead 402 that discharge the various colors of ink are positioned as Y, M, C, and Bk, the inverse of the first printhead 401. In FIG. 2, the nozzle arrays that discharge the various colors of ink are a printhead made of two nozzle arrays, and it is also permissible to use a printhead comprising a plurality of nozzle arrays per color.

The printing apparatus has a carriage that supports the first printhead 401 and the second printhead 402, and moves the first printhead 401 and the second printhead 402 reciprocally, in accordance with printing operations. The carriage 403 is positioned at H in the diagram in standby mode, including but not necessarily limited to a non-printing state. A reference numeral 403 is an image printed onto a printing medium 407, via a printing scan with the printheads 401 and 402. A reference numeral 404 is a paper advance roller, which rotates in the direction of the arrow in the diagram together with an auxiliary roller 405 and while restraining the printing medium 407, constantly feeding the printing medium 407 in a direction Y, i.e., the duplicate scan direction. A reference numeral 406 is a paper feed roller that performs the feed of the printing medium 407, including but not necessarily limited to printing paper, as well as fulfilling the role of guiding the printing medium 407 in a manner similar to that of the paper advance roller 404 and the auxiliary roller 405. In these circumstances, there are 1280 nozzles for each of the four colors, Bk, C, M, and Y, which are positioned in the direction of the paper advance on the printheads 401 and 402.

Following is a description of the basic reciprocal printing operations according to the embodiment of the present invention possessing the preceding assembly. That is, the carriage, in the home position H when on printing standby, performs printing operations scanning in a direction X, i.e., the main scanning direction, following an instruction to commence printing. A plurality of nozzles on the first printhead 401 and the second printhead 402 then performs printing by discharging ink onto the printing medium 407, in accordance with printing data.

When the printing of the printing data concludes at the end of the printing medium 407, the carriage 403 returns to the original home position H. After which, the paper advance roller 404 advances the printing medium 407 in the direction of the arrow, advancing only by an amount equivalent to the prescribed width in the direction Y, for example, the printing width printed by the first printhead 401 and the second printhead 402. Then, the print scanning commences again, in accordance with the next printing data, in the direction X. Repeating the printing scan operations of the first printhead 401 and the second printhead 402, and the paper advance operations of the paper advance roller 404, in accordance with the printing data, prints an image on the printing medium 407.

First Embodiment

Figure 3:
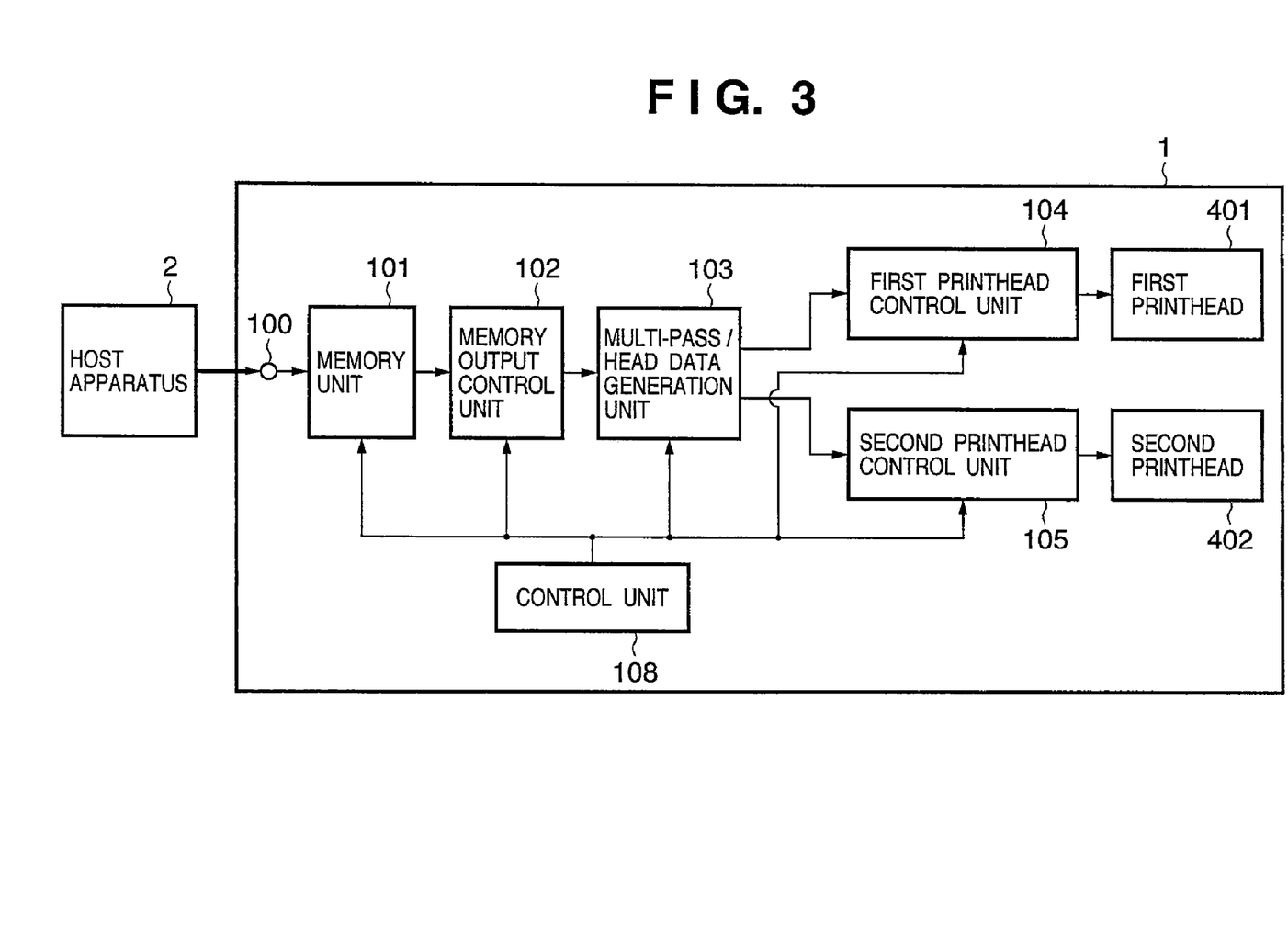

Following are detailed descriptions of embodiments of the inkjet printing apparatus to which the present invention is applied, using the printing apparatus described in FIGS. 1 and 2. An assembly that controls printing operations for the first printhead 401 and the second printhead 402, by way of thinning or down-sampling process using a mask pattern, is in place. FIG. 3 describes the printhead control block. Hereafter, the downsampling process or thinning process is called a thinning process.

Not shown is the fact that in the interior of the inkjet printing apparatus according to a first embodiment is a control unit, comprising a CPU, ROM, RAM, and a dedicated circuit, that controls and executes image processing. Furthermore, the interior of the inkjet printing apparatus according to the first embodiment also comprises an interface unit, for sending and receiving image information or all types of control information between the inkjet printing apparatus and an external computer or other apparatus. The interior of the inkjet printing apparatus also comprises such motors and drivers as a carriage motor, for driving the carriage, a paper feed motor, for driving the paper feed roller, and a paper eject motor, for ejecting paper, as well as a driver for driving the printheads, to drive the first printhead 401 and the second printhead 402. The interior of the inkjet printing apparatus also comprises such elements as an operating panel for user input of control information.

FIG. 3. is a block diagram that depicts an assembly of key components of a printhead control block according to the embodiment of the present invention. Not only does the inkjet printing apparatus spread the printing dots to the first printhead 401 and the second printhead 402 and perform reciprocal printing according to the embodiment, it also adopts the multi-pass printing method that forms an image by making a plurality of printing scans of a given area.

As per the preceding, multi-pass printing is a printing protocol that minimizes density discrepancies arising from subtle differences in ink discharge volume or direction between nozzles, by using a plurality of nozzles on a printhead on a single line to form an image.

Among the multi-pass printing protocols are a random mask thinning protocol that generates pass data by eliminating the regularity of nozzles in use and randomly thinning the data, and a data thinning protocol that generates pass data by thinning printing dots. The specification refers to the printing data to which the printhead nozzles and ink discharge positions correspond, and which is used by the printhead when performing a printing scan, as pass data. In particular, according to the embodiment, a multi-pass printing protocol is executed that combines the random mask thinning protocol and the data thinning protocol. The description of the multi-pass printing employs two printing passes, i.e., the number of scans that the printhead performs over a given area of the printing medium, for demonstration purposes.

A reference numeral 1 is an inkjet printing apparatus capable of printing a full-color image. A reference numeral 101 is a memory unit that temporarily stores printing data that is sent from an externally connected host apparatus 2, via an input terminal 100, and image processed for printing purposes. The first and second printheads 401 and 402 also store two bits of data that signify the number of printing passes. A reference numeral 102 is a memory output control unit, which performs read-out processing of printing data, in accordance with the relative positions on a printing medium 407 of each of the inks within the first and second printheads 401 and 402.

A reference numeral 103 is a multi-pass/head data generation unit, which thins printing dots and generates pass data for the first printhead 401 and pass data for the second printhead 402, pursuant to the number of printing passes.

A reference numeral 104 is a first printhead control unit, which issues the various control signals for operating the first printhead 401. A reference numeral 105 is a second printhead control unit, which issues the various control signals for operating the second printhead 402. The first printhead 401 discharges ink onto the printing medium 407, pursuant to the first printhead pass data. The second printhead 402 discharges ink onto the printing medium 407, pursuant to the second printhead pass data. A reference numeral 108 is a control unit that both monitors the status of the various units and performs various controls relating to the operations of the first and second printheads 401 and 402.

Following is a description of the basic printhead control operations of the overall printhead block, as depicted in FIG. 3. The memory unit 101 temporarily stores printing data according to the various respective inks that is subjected to binary processing within the host apparatus 2, and received via the input terminal 100. The output control unit 102 is controlled according to the printing area controls issued by the control unit 108. It reads out binary printing data stored in the memory unit 101 on a per printing scan basis pursuant to the relative positions of the nozzle groupings of the printheads 401 and 402 that correspond to the respective ink colors, and outputs the data to the multi-pass/head data generation unit 103.

The multi-pass/head data generation unit 103 uses the combination of the random mask thinning protocol and the data thinning protocol to generate first printhead pass data for the first printhead 401, according to the number of printing passes. It generates second printhead pass data for the second printhead 402 in similar fashion. It then outputs the generated first printhead pass data and second printhead pass data to the first printhead control unit 104 and second printhead control unit 105, respectively. Details of the respective pass data generation methods for the first printhead 401 and the second printhead 402 will be described hereinafter.

Figure 4A:
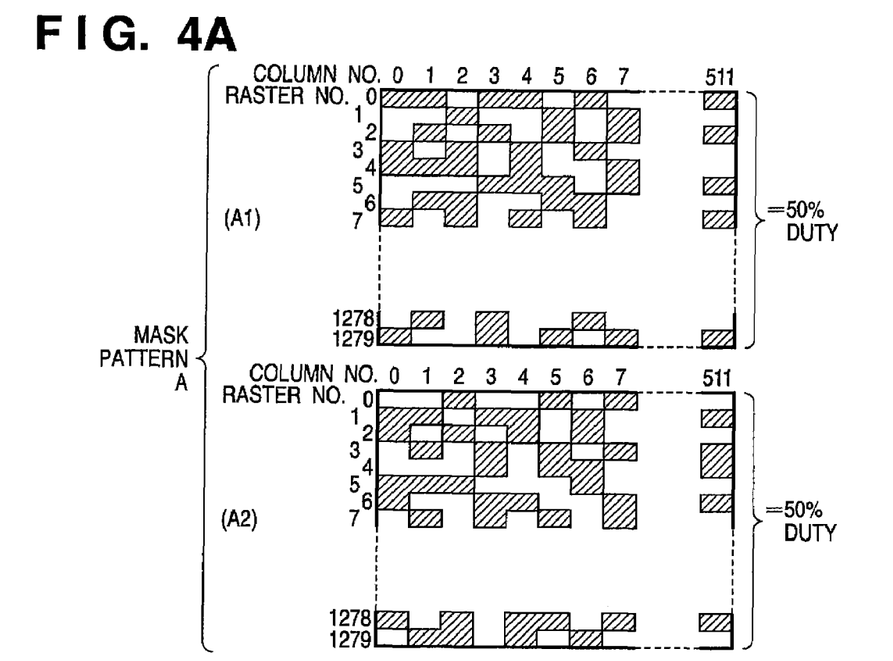
FIG. 4A and FIG. 4B are schematic diagrams that depict various random mask patterns used according to the embodiment of the present invention.
Figure 4B:
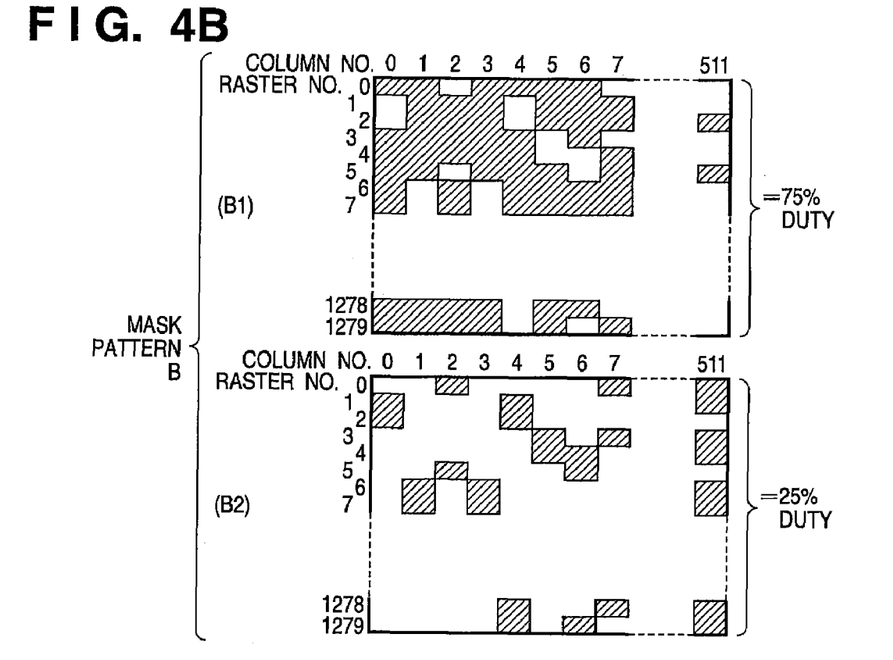

The A1, A2, B1, and B2 random mask patterns depicted in FIGS. 4A and 4B as being stored in the memory unit 101 are used according to the embodiment. A two-pass reciprocal printing of printing data is performed concurrently by performing thinning processing using the data thinning pattern that is the houndstooth check pattern depicted in FIG. 5A, and the inverse houndstooth check pattern depicted in FIG. 5B.

As depicted in FIG. 4A, a set of a random mask pattern A1 and a random mask pattern A2 are treated as a mask pattern A, while a set of a random mask pattern B1 and a random mask pattern B2 are treated as a mask pattern B, as depicted in FIG. 4B. The random mask patterns A1 and A2 are thinning masks, each of which have 50% of the printing duty, with the random mask pattern A2 being the inverse of the printing and non-printing components of the random mask pattern A1. The random mask pattern B1 is a thinning mask with 75% printing duty, and the random mask pattern B2 is a thinning mask with 25% printing duty, with the random mask pattern B2 being the inverse of the printing and non-printing components of the random mask pattern B1.

The random mask patterns A1 and A2 of the mask pattern A, the random mask patterns BD and BE of the mask pattern B, and the houndstooth check pattern and inverse houndstooth check pattern all have a printing density of 1200 dpi. The raster direction, i.e., the printhead print scanning direction, is set at 1280 pixels, which, multiplied by orthogonal columns of 512 pixels, in the direction of the advancement of the printing medium, results in a pattern possessing a printing area of 655,360 pixels in total.

Figure 5A:
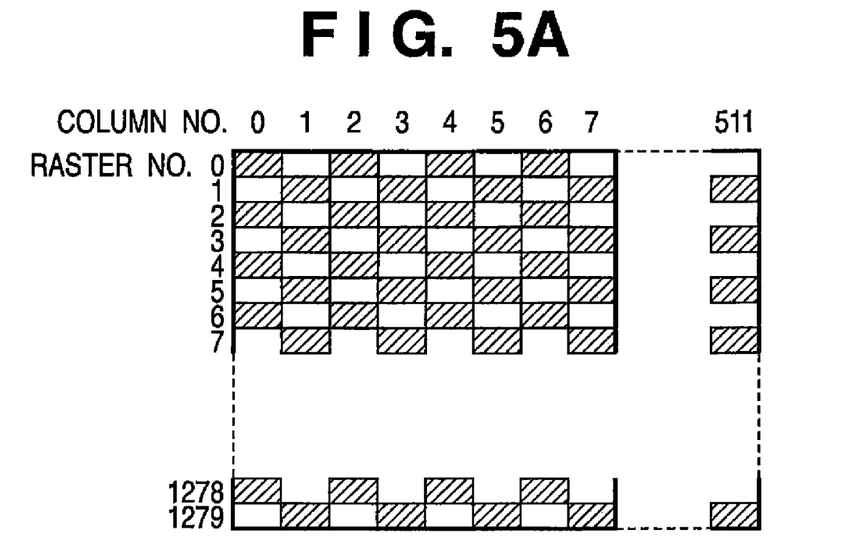
FIG. 5A and FIG. 5B are schematic diagrams that depict houndstooth check and inverse houndstooth check patterns used according to the embodiment of the present invention.
Figure 5B:
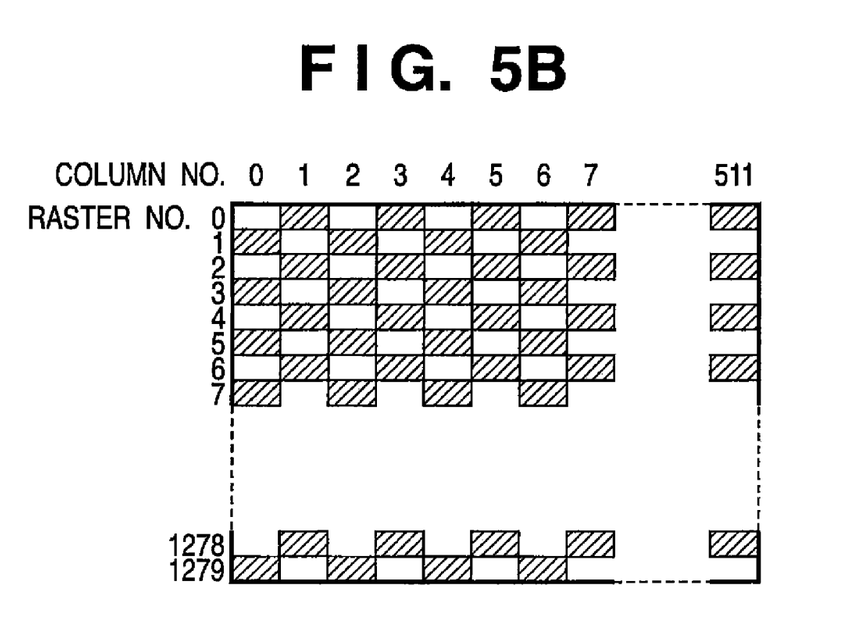

That is, printing duty is partitioned into 50% duty printing pixels, using a houndstooth check pattern that fits the houndstooth check pattern on a per horizontal and vertical one pixel basis, as depicted in FIG. 5A, as well as an inverse houndstooth check pattern that is the opposite of the houndstooth check pattern, as depicted in FIG. 5B. According to the embodiment, the example assumes two printing passes, with the printing duties of the first pass and of the second pass being equivalent, and with the printing element distribution being performed using the houndstooth and inverse houndstooth check patterns as depicted in FIG. 5. When performing multi-pass printing of more than one printing pass, it is permissible for the printing duty of the passes to be equivalent or different. For example, if performing a four-pass printing, there is a 25% equivalent thinning method for each pass, as a method of differentiating between the passes, at 20%, 30%, 30%, and 20%, respectively. Either equivalent thinning or differentiated thinning may be applied to the present invention.

The following section describes processing for generation of pass data used in each printing scan of two-pass reciprocal printing. For the purposes of this description, the random mask pattern being used will be 50%-50% mask pattern A in FIG. 4A.

The first printhead 401 has data thinning processing performed using the houndstooth check mask pattern in FIG. 5A, vis-à-vis the printing data stored in the memory unit 101, and the second printhead 402 has data thinning processing performed using the inverse houndstooth check mask pattern in FIG. 5B, vis-à-vis the printing data. Reciprocal print scanning is thus performed using the first and second printheads 401 and 402.

The first printhead 401's forward print scanning generates printing data (1) as printing pixels for only the overlapping portions of the printing data that underwent data thinning processing using the pattern in FIG. 5A, and the printing pixels for random mask pattern A1. The first printhead 401's reverse print scanning generates printing data (3) as printing pixels for only the overlapping portions of the printing data that underwent data thinning processing using the pattern in FIG. 5A, and the printing pixels for random mask pattern A2.

Conversely, the second printhead 402's forward print scanning generates printing data (2) as printing pixels for only the overlapping portions of the printing data that underwent data thinning processing using the pattern in FIG. 5B, and the printing pixels for random mask pattern A2. The second printhead 402's reverse print scanning generates printing data (2) as printing pixels for only the overlapping portions of the printing data that underwent data thinning processing using the pattern in FIG. 5B, and the printing pixels for random mask pattern A1. It is thus possible to partition the total pixels in an area capable of being printed by a single printing scan among the first printhead 401 and the second printhead 402, for every two printing scans.

Figure 6:
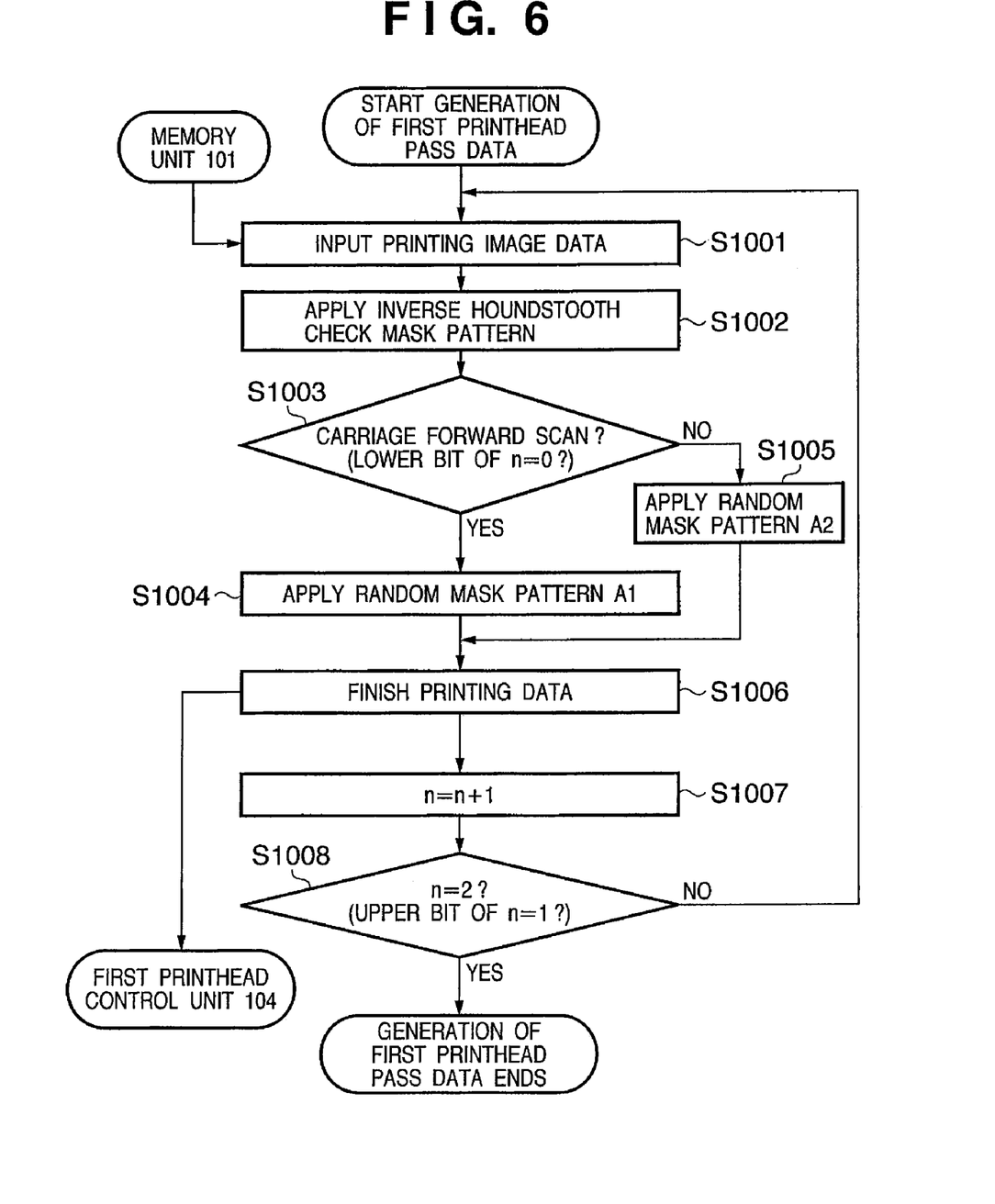
FIG. 6 is a flowchart that depicts the flow of generation of pass data for the two-pass first printhead according to the embodiment of the present invention.

FIG. 6 is a flowchart that describes processing of generation of pass data for the multi-pass/head generation unit of the first printhead, pertaining to the control system within the printing apparatus. When printing data stored by the memory unit 101 is inputted in step S1001, the process proceeds to step S1002, which performs data thinning processing by applying the houndstooth mask check pattern in FIG. 5A to the inputted printing data.

After reading out the number of printing scans variable n that is stored in the memory unit 101, a determination is made in step S1003 as to the print scanning direction of the first printhead 401 by checking a lower bit thereof.

Of the reciprocal printing scan, when the printing scan is the forward printing scan, i.e., the lower bit of n is 0, the process proceeds to step S1004, wherein the print data (1) is generated by applying the random mask pattern A1 to the printing data that was subjected to data thinning processing in step S1001. When it is the reverse printing scan, i.e., at least the lower bit of n is 1, the process proceeds to step S1005, wherein the print data (3) is generated by applying the random mask pattern A2 to the printing data that was subjected to data thinning processing in step S1001. The process then proceeds to step S1006, thinning processing of the printed image data ends, and a single instance of print data used printing in either the forward printing scan direction or the reverse printing scan direction of each printhead is complete. When the completed data (1) and (3) is outputted to the first printhead control unit 104, it is transferred to the first printhead 401, and printing of the image to the printing medium is performed, subject to timing.

Once printing ends, processing proceeds to step S1007, wherein the number of printing scans variable n is incremented by 1, after which processing proceeds to step S1008, wherein the value of n is assessed. In this event, if the value of n is 2, i.e., the upper bit of n is 1, pass data generation processing for the first printhead 401 ends. If n is less than 2, however, i.e., the upper bit of n is 0, processing returns to step S1001, and pass data generation processing takes place once more.

Figure 7:
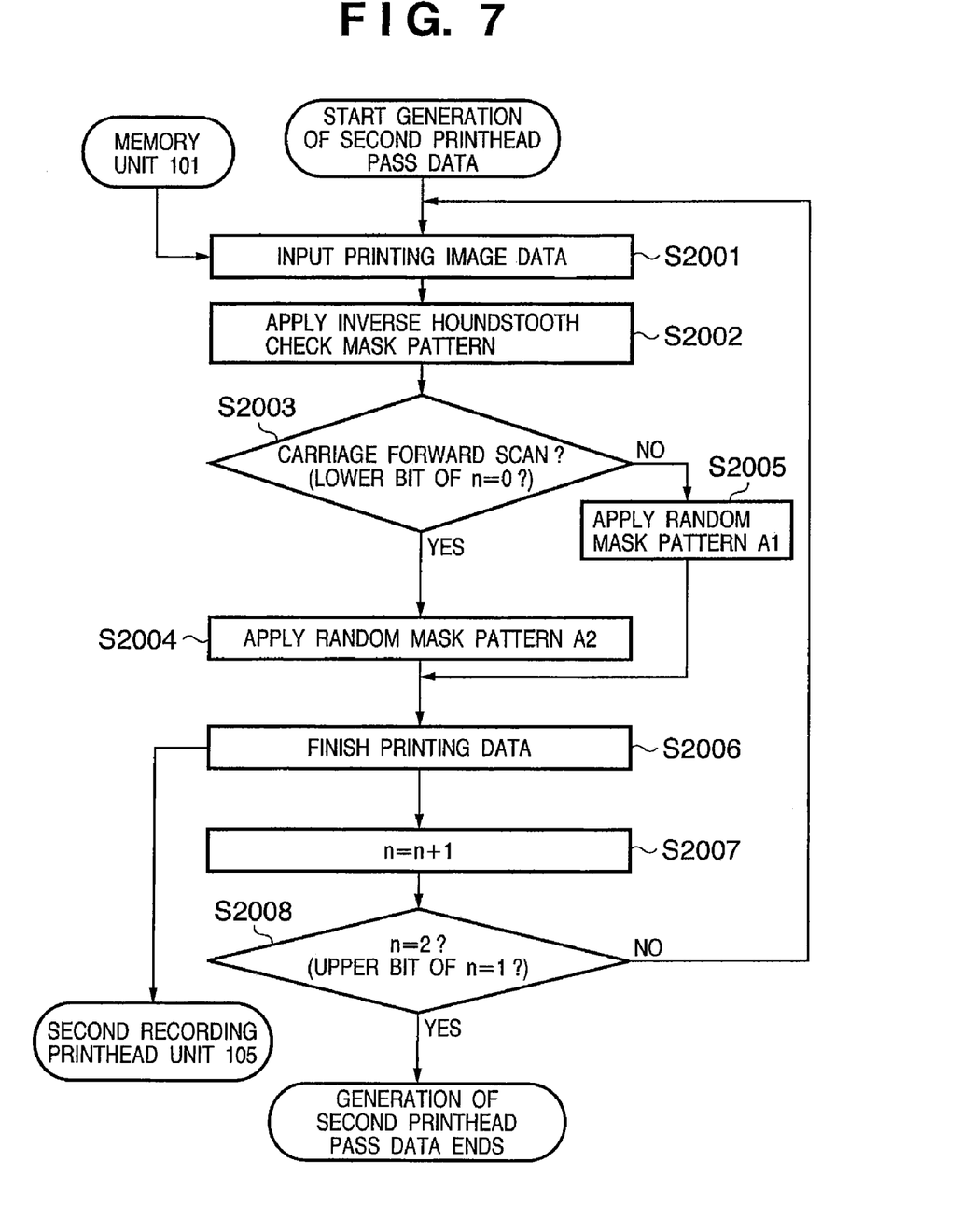
FIG. 7 is a flowchart that depicts the flow of generation of pass data for the two-pass second printhead according to the embodiment of the present invention.

FIG. 7 is also a flowchart that describes processing of generation of pass data fox the second printhead 402. The second printhead 402 performs data thinning processing vis-à-vis the printing data stored in the memory unit 101, by applying the inverse houndstooth check pattern to the inputted image data, because the second printhead 402 is positioned at front-side in case of reciprocal print scanning. A determination is then made of the second printhead 402's print scanning direction, pursuant to the lower bit of the number of printing scans variable. If in the forward scanning direction, the printing data (2) is generated by applying the random mask pattern A2 in step S2005. If in the reverse scanning direction, the printing data (4) is generated by applying the random mask pattern A1 in step S2004. The foregoing describes a method of generating printing data, using the 50% printing duty random mask A, and that is in turn used when the printheads 401 and 402 perform reciprocal print scanning. Using the random mask pattern B with 75%-25% printing duty as the thinning mask that is used when generating the printing data results in printing being performed with the high printing duty from the front-side printhead for the respective printing scans. In other words, with regard to the forward printing scan, the first printhead 401 corresponds to the front-side printing element array, per FIG. 2, and the printing data is generated using the random mask pattern B1. Given that the printing data for the second printhead 402 is generated using the random mask pattern B2, the printing duty, at 25%, is lower than the printing duty for the first printhead 401. With regard to the reverse printing scan, the second printhead 402 corresponds to the front-side printing element array, and the printing data is generated using the random mask pattern B1. Given that the printing data for the first printhead 401 is generated using the random mask pattern B2, the printing duty for the printhead positioned at the front-side in the direction of the scan, i.e., the second printhead 402, is higher than that for the printhead positioned on the back-side, even with regard to the reverse printing scan.

Using the mask pattern B when generating the printing data, when moving in the forward scanning direction, the printing data (1) for the front-side printhead in the printing scan direction, i.e., the first printhead 401, is used three times more than the printing data (2) for the back-side printhead, i.e., the second printhead 402. Similarly, even when moving in the reverse scanning direction, the printing data (4) for the front-side printhead in the printing scan direction, i.e., the second printhead 402, is used three times more than the printing data (3) for the back-side printhead, i.e., the first printhead 401.

Using the mask pattern B to generate the printing data for the respective printheads minimizes the frequency of use of the back-side printhead for the print scanning direction, with its short printing time interval vis-à-vis the front-side printhead, which allows minimizing of the volume of ink discharged by the back-side printhead. Doing so allows minimizing color running or bleeding that results from discharging ink from the back-side printhead before ink discharged from the front-side printhead adheres to the printing medium. Given that the front-side printhead in the scanning direction performs printing once a comparatively long time has passed from the time that the image has been printed in the previous printing scan, it is possible to minimize color running or bleeding. Given that the ink is discharged from the front-side printhead in the scanning direction once the ink that is discharged in the previous printing scan adheres to the printing medium makes color running or bleeding more difficult, even if the back-side printhead discharges a large amount of ink.

It is apparent that the effect of keeping color running or bleeding to a minimum is greatly dependent on the printing paper. Paper with a thick coating or composite paper has significant reduction in color running or bleeding, whereas photographic paper shows little benefit. Printing methods that greatly expand printing duty of the front-side printing element array risk instability in discharges when there are a large number of nozzles on the printing element array, and a printing area, i.e., the length of the nozzle row, becomes significantly long as a result, owing to reasons that may include, but are not limited to, failure to refill the ink in time. Accordingly, a decision is made whether to use mask pattern A or B, depending on the type of printing paper.

Figure 8:
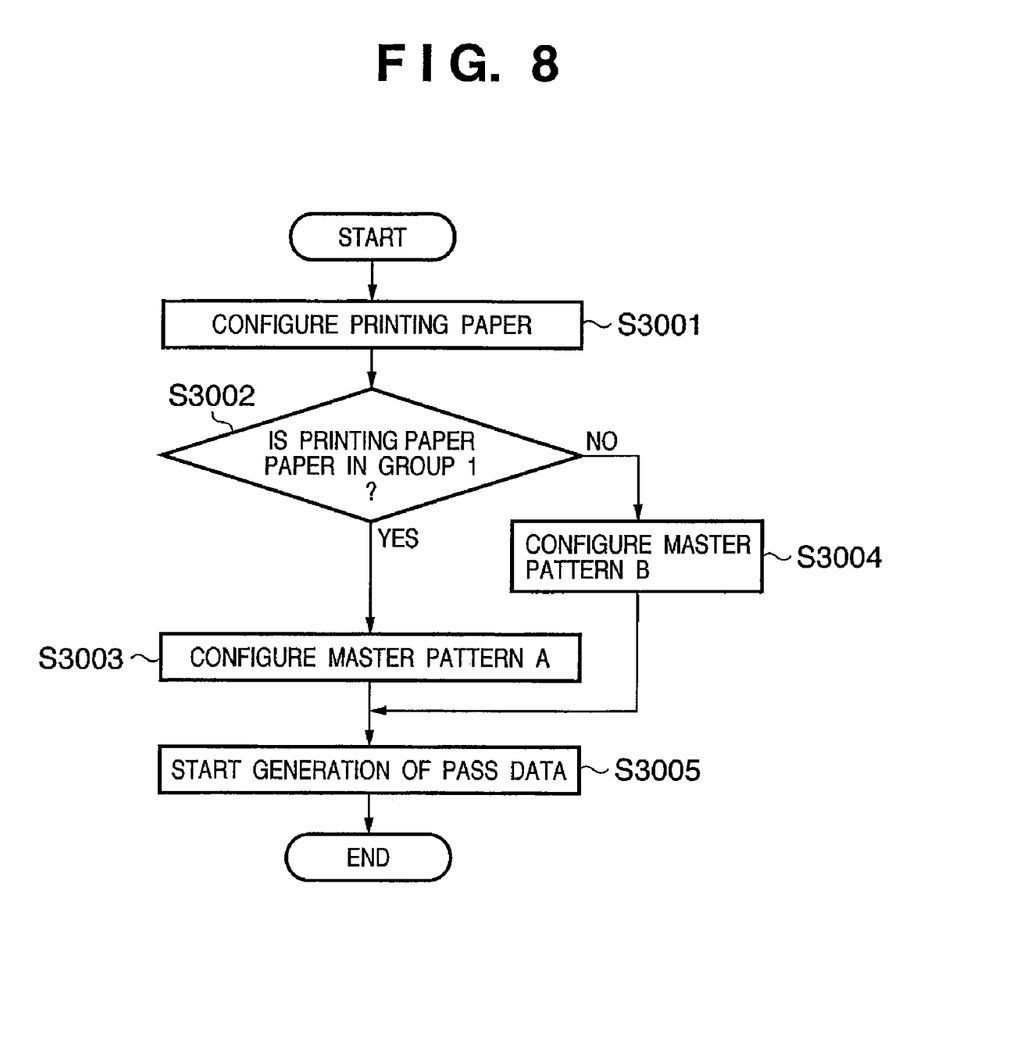
FIG. 8 is a flowchart that depicts operations of the first embodiment according to the embodiment of the present invention.

FIG. 8 depicts a flowchart that determines the mask pattern to be used. Printing paper that does not show significant benefit versus printing duty distribution, such as photographic paper, are classed as Group 1, and printing paper that does show significant benefit versus printing duty distribution, such as paper with a thick coating or composite paper, are classed as Group 2.

The process begins by setting the printing paper type, in step S3001. In step S3002, if printing paper has been set to Group 1, processing proceeds to Step S3003, and the mask pattern is set to A. Processing then proceeds to step S3005, and the pass data generation process is performed. If the printing paper has not been set to Group 1 in step S3002, the printing paper will be considered set to Group 2, the mask pattern is set to B, and processing proceeds to Step S3005, wherein the pass data generation process is performed.

Table 1 depicts the duty distribution benefit versus printing paper, together with the accompanying printing paper categories and mask pattern settings.

TABLE 1

|  | Duty Distribution Effect | Printing Paper Group | Mask Pattern |
|---|---|---|---|
| Thick Coating Paper | ◯ | 2 | B |
| Photographic Paper | Δ | 1 | A |
| Synthetic Paper | ◯ | 2 | B |

◯: Effective
Δ: Not Particularly Effective

Switching the mask pattern in response to the type of printing medium in the foregoing manner allows high quality with minimal occurrence of blending or bleeding, as well as printing in a stable discharge state. While the present example presumes two printing media groups and two mask patterns, it is permissible to have three or more printing media groups and corresponding mask patterns as well.

Second Embodiment

General tendencies regarding ink absorbency or likelihood of occurrence of bleeding are affected by the number of printing passes, with the emerging trend being that these qualities improve as the number of passes increases. The ideal, however, is to perform printing in as few passes as possible, in order to achieve high-speed printing.

Generating printing data using a mask pattern with a printing duty with a different printing data distribution rate in response to the number of printing passes facilitates balancing high image quality with stability in printing. When printing with few passes, the invention allows using masks that distribute printing duty to obtain high image quality. When using many passes, using mask patterns that do not distribute printing duty allows printing with stable ink discharge.

Figure 11:
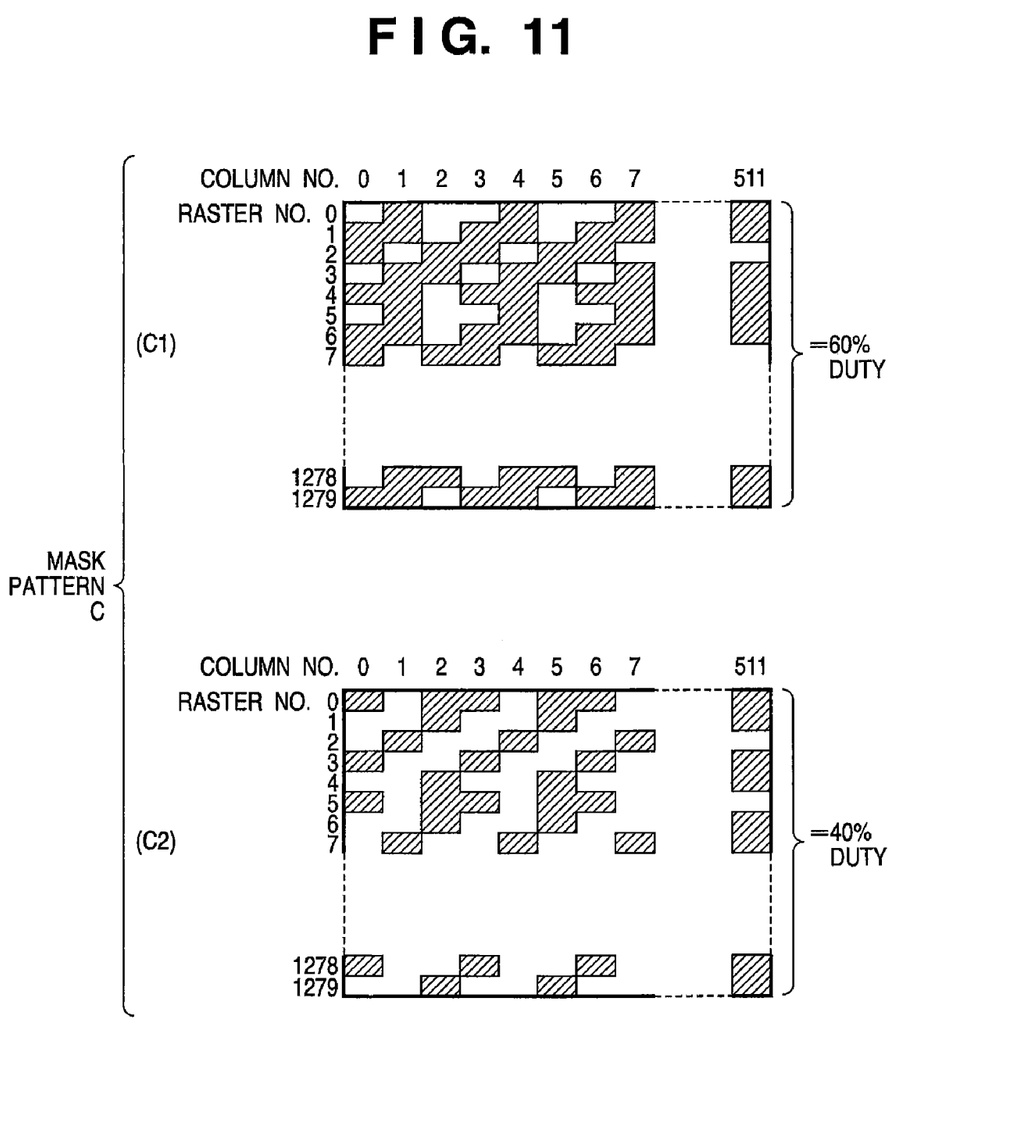
FIG. 11 is a schematic diagram that depicts a random mask pattern that is used according the embodiment of the present invention.

In addition to the random mask patterns A and B in FIG. 4, a random mask pattern C, as depicted in FIG. 11, is available for use in generating the printing data. The printing data is reduced and partitioned during the data thinning processing when performing multi-pass printing with two or more passes. Applying the random mask patterns A-C to the partitioned printing data generated the printing data, or pass data.

Figure 9:
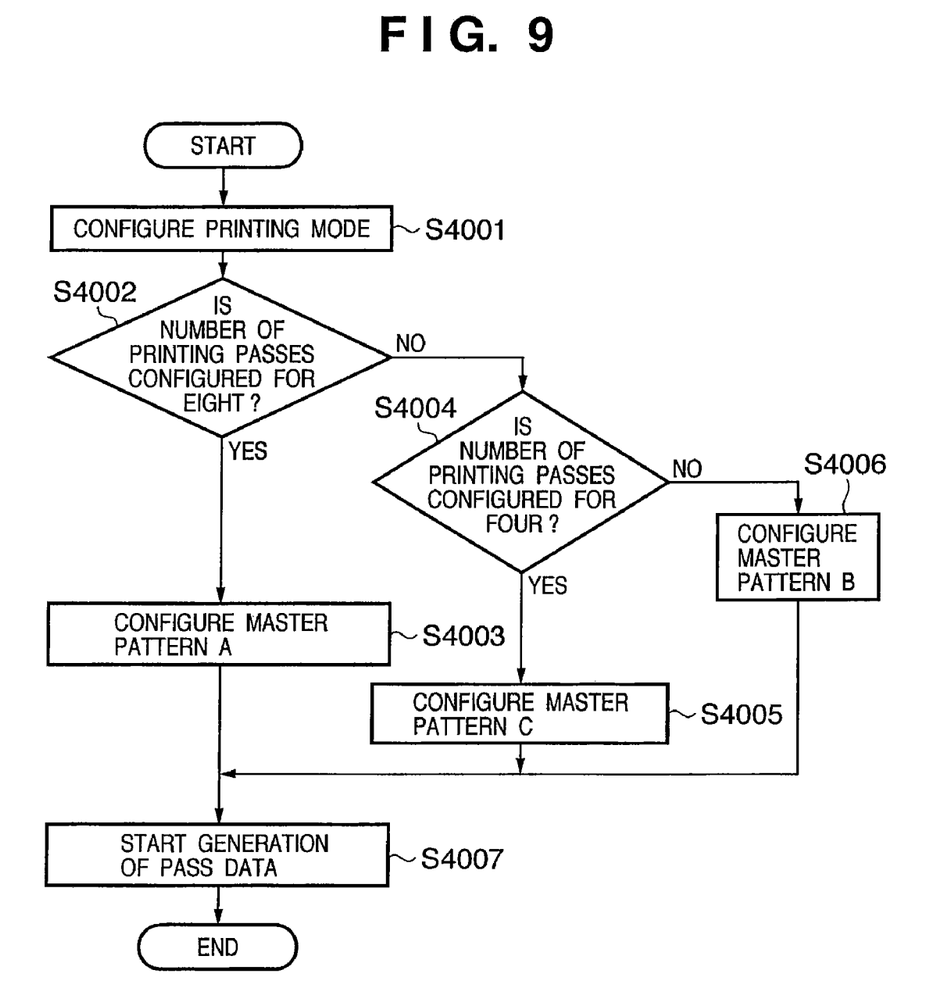
FIG. 9 is a flowchart that depicts operations of the second embodiment according to the embodiment of the present invention.

FIG. 9 is a flowchart that depicts the determination of the mask pattern to be used. The number of printing passes is configured in step S4001. A determination is made in step S4002 as to whether or not the number of printing passes is eight. If it is determined in step S4002 that the number of printing passes is eight, the process proceeds to step S4003, and mask pattern A is configured. If it is not determined in step S4002 that the number of printing passes is eight, a determination is made in step S4004 as to whether or not the number of printing passes is four. If it is determined in step S4004 that the number of printing passes is four, the process proceeds to step S4005, and mask pattern C is configured. If it is not determined in step S4004 that the number of printing passes is four, the process proceeds to step S4006, and mask pattern B is configured. In step S4007, generation of pass data commences, using the mask pattern that was configured in step S4003, 4005, or 4006. It is thus possible to obtain a quality printed image with ease, by changing the mask pattern used to generate the pass data in response to the number of printing passes, according to the embodiment.

Table 2 numbers of passes corresponding mask patterns to be used in generating pass data.

TABLE 2

| Number of Passes | Mask Pattern |
| --- | --- |
| 2 | B |
| 4 | C |
| 8 | A |

Third Embodiment

Changing of mask patterns takes place beginning with the combination of type of printing medium and printing mode.

Ink absorbency varies depending on the type of printing medium. Increased ink absorbency allows increases in the volume of ink printed from ink discharged in a given printing scan. Increasing the volume of ink printed from ink discharged in a given printing scan allows reductions in the number of printing passes. An inkjet printing apparatus is configured for a plurality of varying types of printing modes, which may include, but are not limited to, image quality of the printed image or time required for printing. For example, there may be a quality mode, which places priority on obtaining a high quality image, rather than on the time required for printing, a fast mode, which places priority on thinning the time required for printing, rather than on image quality, and a default mode, which balances image quality with the time required for printing. The plurality of printing modes vary image quality or time required for printing by varying the number of printing passes or the scanning speed of the printhead. Selecting the mask pattern to be used in generating the pass data in response to the printing medium type and the printing mode allows balancing high image quality and stability in printing, according to the embodiment.

Figure 10:
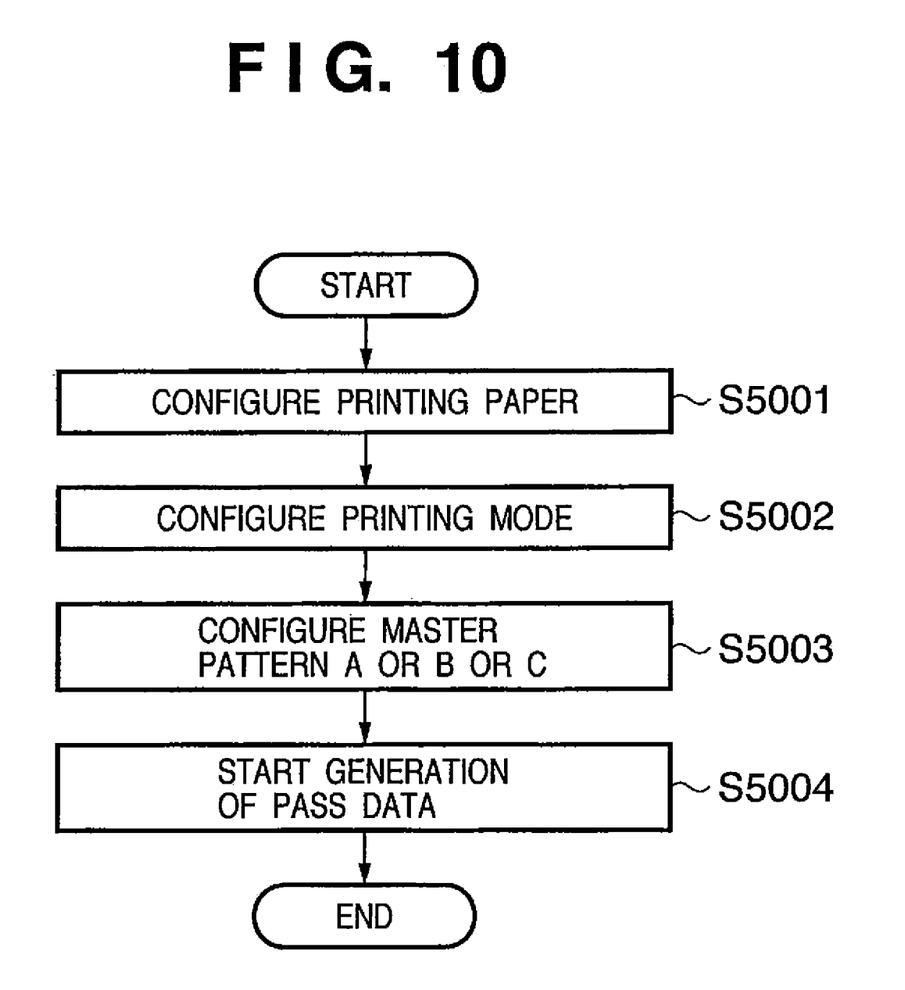
FIG. 10 is a flowchart that depicts operations of the third embodiment according to the embodiment of the present invention.

Table 3 depicts the correspondence between the type of printing medium, the printing mode, and the mask pattern used to generate pass data. FIG. 10 depicts a flowchart of the determination of the mask pattern used to generate pass data.

The type of printing medium to be used in printing is configured in step S5001, and the printing mode is configured in step S5002. The mask pattern corresponding to the type of printing medium and the printing mode is selected in step S5003, in accordance with Table 3. The process proceeds to step S5004, and commences generating pass data. Printing is then performed in line with the pass data, or printing data, so generated. An example of a printing mode configuration method might be to use the print driver installed on the host apparatus 2 that controls the inkjet printing apparatus 1, to which the host apparatus 2 is connected, to perform the configuration.

TABLE 3

| Printing medium Type | Printing Mode | Number of Passes | Mask Pattern |
| --- | --- | --- | --- |
| Printing medium 1 | Quality | 8 | A |
|  | Default | 4 | C |
|  | Fast | 2 | B |
| Printing medium 2 | Default | 4 | A |
|  | Fast | 2 | A |
| Printing medium 3 | Quality | 8 | B |
|  | Default | 4 | C |

Forth Embodiment

It is possible to change the mask pattern being used at will, according to the embodiment. Changing the mask pattern being used at will, in response to such varied printing conditions as the number of passes, the type of printing medium, or the printing mode, allows obtaining high-quality images.

While, according to the embodiments of the present invention, three types of distribution of duty, 50%-50%, 75%-25%, and 60%-40%, are depicted, the distribution of duty is not restricted to these types, and any combination is possible if masks are used that total 100%. Correspondingly, such other elements as groupings of printing paper or printing mode settings are not restricted to two or three types either. Printing duty may also vary according to ink color type. It is also permissible to increase printing duty in the front-side of the scan direction only for inks that do not easily adhere to the printing medium, and thus, are prone to color blending, and constitute the other inks to print with a single uniform printing duty.

The objective of the present invention is allowing the achievement of a storage medium that stores software program code that facilitates the functions of the embodiments, even if supplied to a system or an apparatus. That is, it is understood that this is achieved even by having a computer, or CPU or MPU, in the system or apparatus load and execute the program code stored in the storage medium. In such circumstances, the program code loaded from the storage medium itself facilitates the functions of the embodiments and the storage medium that stores the program code constitutes the present invention.

Examples of storage media that may be used to supply the program code would, for example, include but are not limited to floppy disks, hard drives, optical disks, magneto-optical disks, CD-ROM, CD-R, magnetic tape, non-volatile memory cards, or ROM. There may also be circumstances wherein the functions of the embodiments are achieved by executing the program code that the computer has loaded.

It is further understood, however, that circumstances are also included wherein an operating system or other software running on the computer performs some or all of the actual processing, in accordance with the directives of the program code, and the processing facilitates the functions of the embodiments. It is further conceivable that the program code that is loaded from the printing medium may be written into memory that is incorporated into an expansion board plugged into the computer, or into an expansion unit that is connected to the computer.

It is also understood that circumstances are also included wherein a CPU or other apparatus that is incorporated into the expansion board or expansion unit performs some or all of the actual processing, in accordance with the directives of the program code, and the processing facilitates the functions of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-376674, filed Dec. 27, 2005, and Japanese Patent Application No. 2006-344671, filed Dec. 21, 2006, which are hereby incorporated by reference herein in their entirety.

What is claimed is:

1. An inkjet printing apparatus having a first nozzle array and a second nozzle array for discharging given ink, which prints image data in accordance with input data on a printing medium by scanning the first nozzle array and the second nozzle array in a given direction, wherein the first nozzle array is a front-side nozzle array in the given direction and the second nozzle array is a back-side nozzle array in the given direction, and controlling the first nozzle array and the second nozzle array to discharge the given ink, the apparatus comprising:

a generation unit adapted to generate printing data to be printed by the first nozzle array and printing data to be printed by the second nozzle array, by thinning the input data using a mask pattern; and a control unit adapted to control the first nozzle array and the second nozzle array to discharge the given ink, based on the printing data generated by said generation unit, wherein said generation unit generates the printing data corresponding to each of the first nozzle array and the second nozzle array using the mask pattern selected from a plurality of mask patterns having different thinning rates, based on type of the printing medium, and the thinning rate upon generating the printing data corresponding to the first nozzle array is not more than the thinning rate upon generating the printing data corresponding to the second nozzle array.

2. The apparatus according to claim 1, wherein the apparatus further prints by scanning the first nozzle array and the second nozzle array in a direction opposite to the given direction, wherein in the given direction, the thinning rate upon generating the printing data corresponding to the first nozzle array is less than the thinning rate upon generating the printing data corresponding to the second nozzle array, and in the opposite direction, the thinning rate upon generating the printing data corresponding to the second nozzle array is less than the thinning rate upon generating the printing data corresponding to the first nozzle array.

3. The apparatus according to claim 1, wherein the first nozzle array and the second nozzle array are arranged on different printheads.

4. The apparatus according to claim 1, wherein the apparatus prints a given area of the printing medium by scanning the first nozzle array and the second nozzle array more than once, and said generation unit generates the printing data corresponding to each of the first nozzle array and the second nozzle array using the mask pattern selected from the plurality of mask patterns having different thinning rates, based on type of the printing medium and the number of scans of the nozzle arrays for the given area of the printing medium.

5. An inkjet printing apparatus having a first nozzle array and a second nozzle array for discharging a given ink, which prints image data in accordance with input data on a printing medium by scanning the first nozzle array and the second nozzle array over a given area of the printing medium, wherein the first nozzle array is a front-side nozzle array in the given direction and the second nozzle array is a back-side nozzle array in the given direction, and controlling the first nozzle array and the second nozzle array to discharge the given ink, the apparatus comprising:

a generation unit adapted to generate printing data to be printed by the first nozzle array and printing data to be printed by the second nozzle array, by thinning the input data using a mask pattern; and a control unit adapted to control the first nozzle array and the second nozzle array to discharge the given ink, based on the printing data generated by said generation unit, wherein said generation unit generates the printing data corresponding to each of the first nozzle array and the second nozzle array using the mask pattern selected from a plurality of mask patterns having different thinning rates, based on the number of scans of the nozzle arrays for the given area of the printing medium, and the thinning rate upon generating the printing data corresponding to the first nozzle array is not more than the thinning rate upon generating the printing data corresponding to the second nozzle array.

6. An inkjet printing method for printing image data in accordance with input data on a printing medium by scanning a first nozzle array and a second nozzle array for discharging given ink in a given direction, wherein the first nozzle array is a front-side nozzle array in the given direction and the second nozzle array is a back-side nozzle array in the given direction, and controlling the first nozzle array and the second nozzle array to discharge the given ink, the method comprising the steps of:

generating printing data to be printed by the first nozzle array and printing data to be printed by the second nozzle array, by thinning the input data using a mask pattern; and controlling the first nozzle array and the second nozzle array to discharge the given ink, based on the printing data generated by said generating step, wherein said generating step generates the printing data corresponding to each of the first nozzle array and the second nozzle array using the mask pattern selected from a plurality of mask patterns having different thinning rates, based on a type of the printing medium, and the thinning rate upon generating the printing data corresponding to the first nozzle array is not more than the thinning rate upon generating the printing data corresponding to the second nozzle array.

7. A computer-readable recording medium storing a computer program for causing a computer to execute a processing method according to claim 6.

* * * * *